No. 823,638. PATENTED JUNE 19, 1906.
C. F. ROPER.
SELVAGE MOTION FOR LOOMS.
APPLICATION FILED JUNE 19, 1905.
3 SHEETS—SHEET 2.
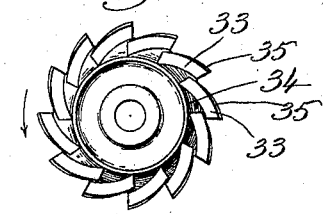
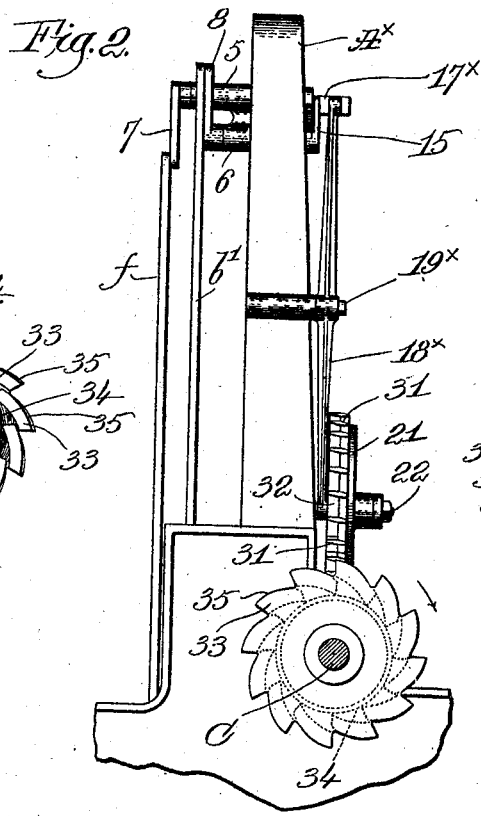
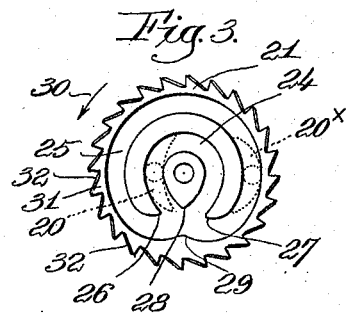
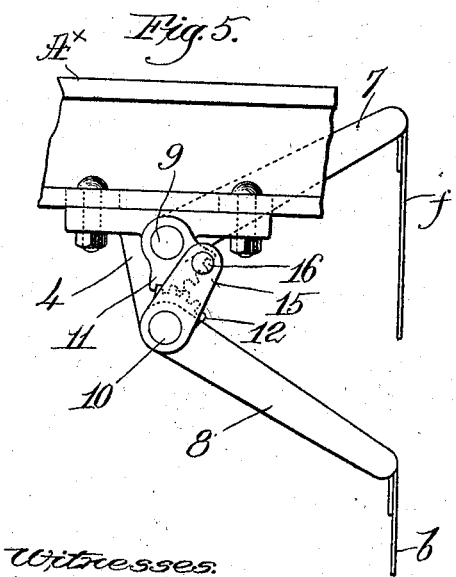
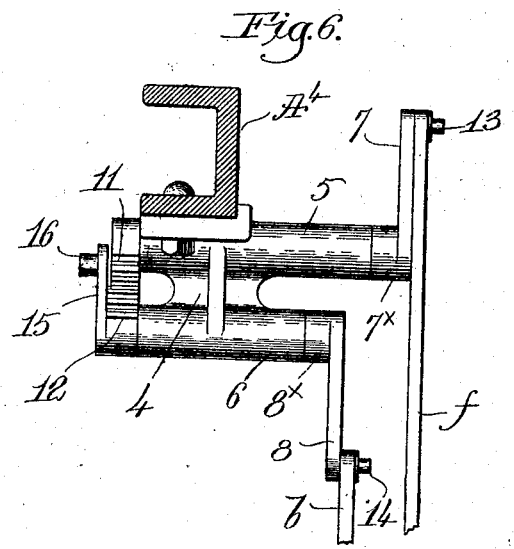
Witnesses:
Thomas J. Drummond
S. Wm. Lutton
Inventor
Charles F. Roper,
by Crosby Gregory
Attys.

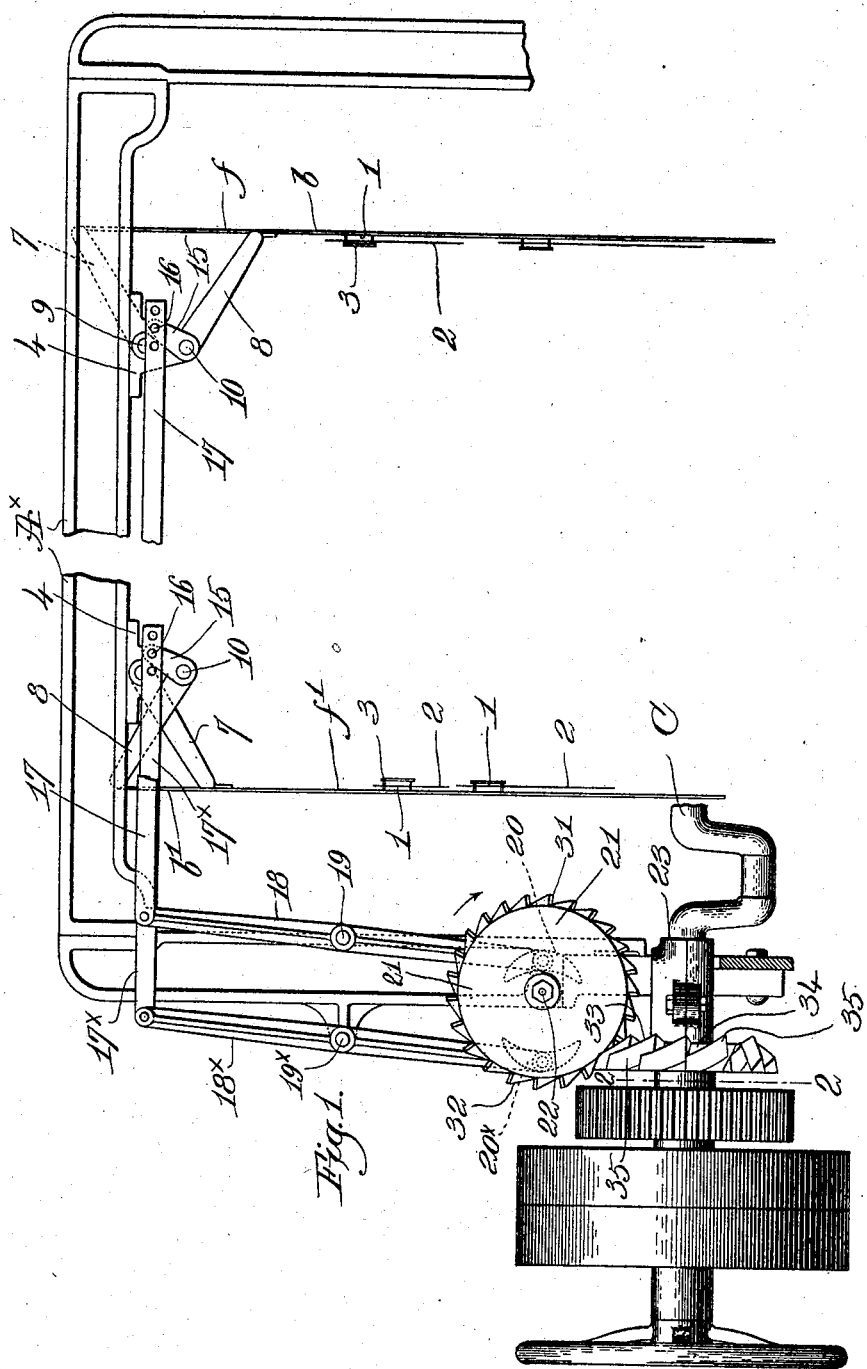

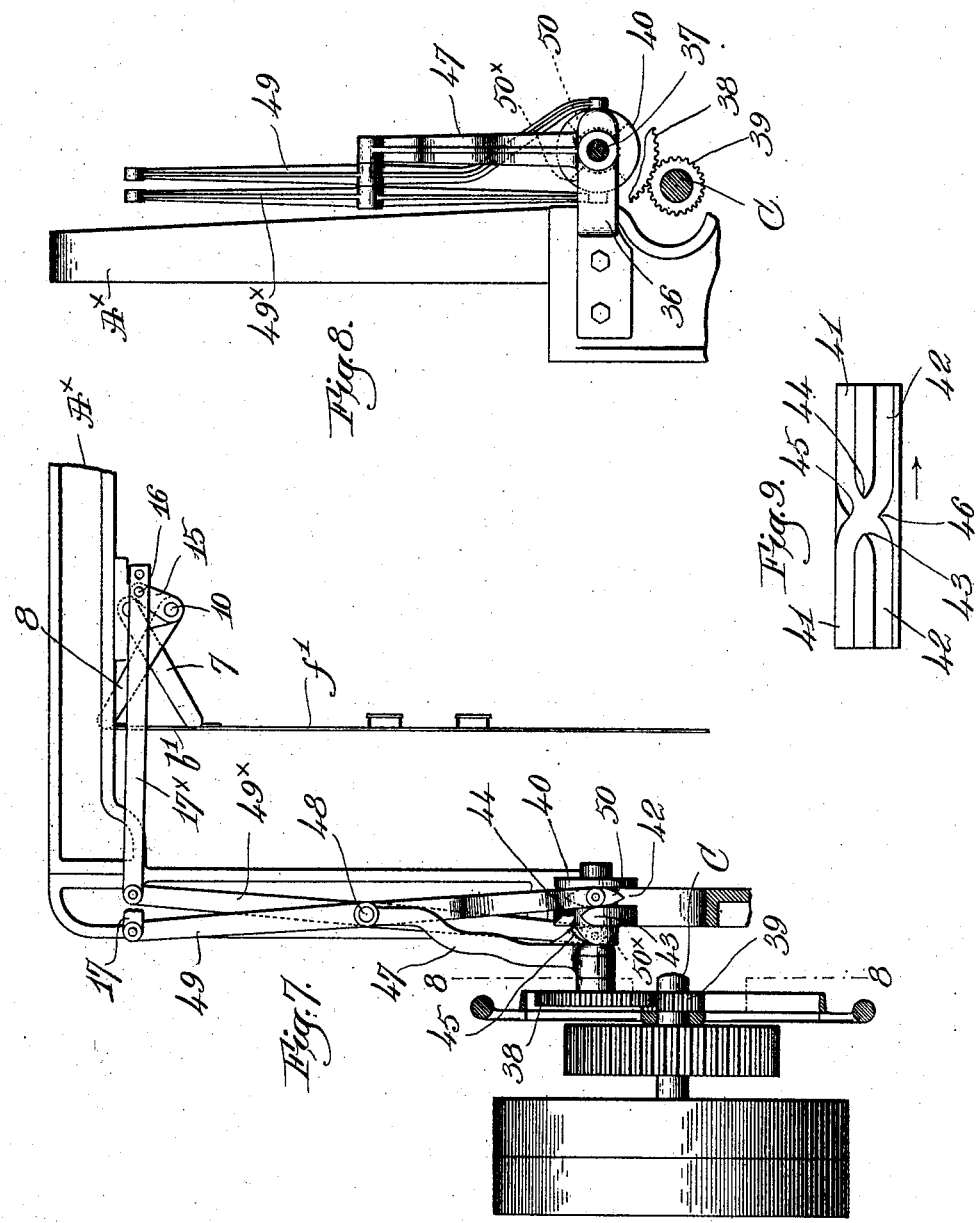

UNITED STATES PATENT OFFICE.

CHARLES F. ROPER, OF HOPEDALE, MASSACHUSETTS, ASSIGNOR TO DRAPER COMPANY, OF HOPEDALE, MASSACHUSETTS, A CORPORATION OF MAINE.

SELVAGE-MOTION FOR LOOMS.

No. 823,638.　　　　Specification of Letters Patent.　　　　Patented June 19, 1906.

Application filed June 19, 1905. Serial No. 265,834.

*To all whom it may concern:*

Be it known that I, CHARLES F. ROPER, a citizen of the United States, and a resident of Hopedale, county of Worcester, State of Massachusetts, have invented an Improvement in Selvage-Motions for Looms, of which the following description, in connection with the accompanying drawings, is a specification, like characters on the drawings representing like parts.

This invention has for its object the production of a novel, simple, and direct-acting selvage-motion for looms, whereby a firm and uniform selvage is produced, the selvage-motion being separate from and independent of the main-shed-forming mechanism.

In the present embodiment of my invention I provide two harness members for the selvage-warps at each side of the loom, and each pair is so connected that a positive motion is imparted to oppositely reciprocate the selvage-harnesses or harness members, a single actuating device operating the two shed-forming mechanisms for each selvage.

The actuating device is of novel construction and it is located in a readily-accessible position yet well out of the way of other parts of the loom mechanism, and herein such actuating device is operated by a direct drive from the loom crank-shaft. I have also provided means to cause the planes of the selvage-shed to be substantially in alinement with the planes of the main shed, thereby preventing accidents which are apt to occur by diversion of the shuttle from its proper path, due to a variation between the main and selvage shed openings.

The selvage-motion herein shown is more particularly adapted for use with metallic heddles, which also serve as warp stop-motion controlling-detectors, whereby the loom may be stopped automatically upon breakage or failure of a selvage-warp; but such heddles form no part of my present invention, as the same are well known and extensively used.

My present invention is not restricted to such use, however, as other forms of selvage-harnesses may be employed in connection with my novel selvage-motion.

The various novel features of my invention will be fully described in the subjoined specification and particularly pointed out in the following claims.

Figure 1 is a rear elevation of a sufficient portion of a loom to be understood, the arch being centrally broken out to save space and with one practical embodiment of my present invention applied thereto. Fig. 2 is a left-hand elevation of the parts at the right of the section, line 2 2, Fig. 1. Fig. 3 is a front face view of the actuator for the selvage-shed-forming mechanisms, showing the crossed cam-path thereon. Fig. 3$^a$ is a face view of one of the switch-followers, to be referred to. Fig. 4 is an inner side elevation of the driving-gear which effects rotation of the actuator, the opposite side elevation being shown in Fig. 2. Fig. 5 is an enlarged detail in rear elevation of one of the overhead connections for and from which a pair of the selvage-harnesses are suspended, showing the means by which a differential movement of such harnesses is effected. Fig. 6 is a right-hand end elevation thereof, viewing Fig. 5 from the right and with the loom-arch in section. Fig. 7 is a rear elevation and partial section of a modified form of actuator and its driving means with a portion of the adjacent mechanism of the selvage-motion. Fig. 8 is an end elevation at the right of the line 8 8, Fig. 7, omitting portions of the transmitting means; and Fig. 9 is a view of the cam-path modified form of the actuator developed.

The arch A$^\times$ of the loom-frame may support in usual manner the main harness-frames of any suitable construction. (Not herein shown as they form no part of my present invention.) The front harness of the main set has in practice a shorter stroke than the one or more behind it, in order that the shed-opening may be the same whether the front harness is up or down, as is well known to those skilled in the art, and herein I have provided means to give a longer stroke to the back selvage-harness of each pair, in order that the planes of the selvage-shed may be substantially in alinement with the planes of the main shed, as will be described. I have herein used two oppositely-movable and vertically-reciprocating harness members for the selvage-warps arranged at each side of the main-shed-forming mechanism.

Referring to Fig. 1, the rods $f$, $b$, and $f'$, $b'$, each having a lateral inwardly-projecting lug 1 to support one or more heddles 2 for the selvage-warps, constitute the selvage-harnesses or harness members, the lugs 1 having lips or flanges 3 to prevent removal of the heddles, which latter may be made as thin flat metallic strips provided with warp-eyes and operating substantially as described in United States Patent to Draper, No. 729,046, dated May 26, 1903.

In practice the lower ends of the rods may slide vertically in suitable guides, such as are shown in said patent, the rods being sufficiently stiff and rigid to properly support the heddles. I have provided a novel overhead connection for each pair of harness members with means to impart a differential reciprocation thereto, and as the connections are alike only one will be described in detail. At proper points the arch $A^\times$ has bolted to its lower flange two brackets 4, (see Figs. 5 and 6,) each having two parallel sleeve-like bearings 5 and 6 transverse to the arch, the longer upper bearing 5 extending forward beyond the lower bearing to properly position the two selvage-harnesses. A rocker 7, having a rigidly-attached shaft 9, is supported by the bearing 5, the shaft rocking therein, the boss $7^\times$, Fig. 6, being at the front end of such bearing, and a segment-gear 11 is secured to the shaft at the inner end of the bearing, the upper end of the rod $f$ being pivotally connected by a stud 13 with the rocker 7. A similar rocker 8 and its attached shaft 10 is supported by the bearing 6, the boss $8^\times$ being at one end thereof and at its other end a segment-gear 12 is secured to the shaft and meshes with the gear 11, a pin 14 on the rocker pivotally connecting it with the rod $b$ of the back selvage-harness. The gear 12 is of less radius than the gear 11, so that there will be a difference in the extent of angular movement of the two rockers, the rocker 8 having the greater amplitude of movement, so that the back selvage-harness connected therewith will be given the longer stroke. This differential movement of the two selvage-harnesses of a pair causes the planes of the selvage-shed to be substantially alined with the planes of the main shed, as and for the reasons hereinbefore set forth.

From the foregoing it will be evident that the selvage-harnesses are suspended from the rockers and that the latter positively raise and depress them in the present embodiment of my invention, and it will also be manifest that the rockers 7 and 8 will move in opposite directions by or through the positive gearing connecting them.

I have herein shown the rockers 8 for the back harness members as operatively connected with the transmitting means between the two selvage-shed-forming mechanisms and the actuator common to both, and to that end each gear 12 has secured to or forming part of it a crank-arm 15, provided with a crank-pin 16, which passes through a hole in one end of a longitudinally rigid link 17 for the right-hand overhead connection, viewing Fig. 1. A similar but shorter link $17^\times$ is pivotally connected with the crank-arm 15 of the overhead connection at the left, Fig. 1, and the outer ends of the two links are pivotally connected with the upper ends of upright levers or vibrators 18 $18^\times$, fulcrumed on the arch at 19 $19^\times$, respectively.

The vibrators are substantially alike, as shown, and their fulcra are in parallelism, their lower ends being provided with what I have termed "switch-followers" 20 $20^\times$, (shown by dotted lines Fig. 3,) a full-face view of one of the followers being shown in Fig. 3$^a$. Each follower is shown as crescent-shaped, and it is pivotally mounted on its vibrator, so that it can change its angular position with relation thereto as it follows the cam-path of the actuator, to be described.

In the embodiment of my invention illustrated in Figs. 1 to 6 the actuator is shown as a disk 21, rotatably mounted on a stud 22, projecting rearward from the arch a short distance above the usual journal-box 23 for the crank-shaft C, the disk having on its front face a crossed cam-path, (shown in Fig. 3 as comprising inner and outer lobes or segments 24 25,) the crossing from one to the other part of the path being between the horns 26 27 and the opposed points 28 29. In the drawings the follower 20 is in the inner lobe 24 and nearest the center of the actuator, and by or through the transmitting means the right-hand overhead connection, Fig. 1, is so positioned that the front selvage-harness is up and its fellow harness down. At the same time the follower $20^\times$ is in the outer lobe 25 of the cam-path farthest from the center, and through the other set of transmitting means and the left-hand overhead connection (see Fig. 1) the corresponding front selvage-harness is down and its fellow, the back harness, is up. As the actuator is rotated in the direction of arrow 30, Fig. 3, the switch-follower $20^\times$ will be deflected by the point 29 and will cross over and enter the inner lobe 24 between the point 28 and horn 26, thereby gradually moving toward the center to reverse or change the selvage-shed governed by the overhead connection at the left, viewing Fig. 1. While this movement of the follower $20^\times$ is taking place, the follower 20 is dwelling as it traverses the lobe 24 to the opening between the point 28 and the horn 27, and when the leading end of the follower emerges and crosses the outer lobe it is deflected by the point 29 and turned into the outer lobe 25 between the said point 29 and the horn 26, the follower 20 thereby being moved away from the center of the actuator to change the selvage-shed at the right, Fig.

1. The followers thus act as switches and traverse the complete cam-path, crossing from the outer lobe to the inner lobe, and vice versa, the proper vibratory motion and dwell being given to the vibrators 18 18$^\times$ in order that the selvage-sheds shall be changed and held open in the required sequence.

The actuator is common to both selvage-shed-forming mechanisms and operatively connected therewith by separate or independent transmitting means, as has been described, the actuator having one complete revolution imparted to it for every two revolutions of the crank-shaft C. I accomplish this in the present instance by a direct drive from said crank-shaft, and owing to the position of the actuator with relation to the journal-box 23 I have devised a peculiar form of driving-gear. The periphery of the disk 21 is provided with a series of skew-teeth 31, and twenty-four of such teeth are made in this instance, the faces 32 being inclined from base to tip in the direction of their length, Figs. 1 and 3, and being skewed or diagonal across the periphery of the disk, Fig. 2. A coöperating driving-gear is secured to the crank-shaft C at the outer end of the journal-box 23, Fig. 1, and the teeth of such gear are spirally arranged and also skewed. The spiral and skew arrangement of the teeth 33 on the conical hub 34 is perhaps shown most clearly in Fig. 4, while the shape of the faces 35 is best shown in Fig. 1, the faces rising from their inner to their outer ends or tips and coöperating with the faces 32 of the teeth on the actuator.

An inspection of Fig. 1 will show the skew arrangement of the teeth, and it also shows the high part of one of the faces 35 in engagement with and just about to pass from the face 32 of an actuator-tooth, while the low or inner end of the next driving-tooth 33 is just engaging the face of the adjacent actuator-tooth. There are half as many driving-teeth 33 as actuator-teeth 31, so that the actuator is rotated once for every two revolutions of the crank-shaft, as before stated. Inasmuch as the faces 35 act from their lowest to their highest points upon the actuator-teeth it will be manifest that the rotative movement of the driving-gear will be transmitted to the periphery of the actuator through the teeth 31 to rotate the actuator, the skew of the two sets of teeth 31 and 33 providing the requisite clearance. I thus secure a direct drive from the loom crank-shaft and without disturbing the shaft-box at that side of the loom, and by means of a single actuator I operate both pairs of harness members for the selvage-warps positively and independently.

A modified arrangement is shown in Figs. 7 to 9, inclusive, including a different form of actuator and different driving-gearing between it and the crank-shaft. A bracket 36 is bolted to the loom side and projects back of the foot of the arch, Fig. 8, to receive a short rotatable shaft 37, parallel to the crank-shaft and having fast upon it at its outer end a spur-gear 38 in mesh with a pinion 39, fixedly secured to the crank-shaft, and on the inner end of the shaft 37 the actuating-cam is secured, herein shown as a cylinder 40, having two parallel portions 41 42 crossing each other between the horns 43 44 and the points 45 46. The bracket 36 has an upturned arm 47, carrying a fulcrum-stud 48, on which are mounted the two vibrators 49 and 49$^\times$, the former being connected by a link, as 17, Fig. 7, with the farther overhead connection and the latter by link 17$^\times$ with the nearer one. (Shown in Fig. 7.) Said vibrators are provided with switch-followers 50 50$^\times$, which are located on opposite sides of the cylinder 40, (see Figs. 7 and 8,) the foot of the vibrator 49 being bent for the purpose. The followers cross from one part of the cam-path to the other as the actuator rotates in a manner readily understood to rock the vibrators in proper time and order. The point 45 deflects follower 50$^\times$ from the part 41 of the cam-path to the other part 42 through the opening between the horn 43, and the point 46 deflects the follower 50 from the part 42 to the other part 41 of the cam through the opening between horn 44 and point 45, the crossing action and the operation of the switch-followers being substantially as has been previously described. In either case the actuator is a pattern-surface so constructed and arranged that it governs the movement of the selvage-harnesses.

Various changes may be made in the details of construction and arrangement by those skilled in the art without departing from the spirit and scope of my invention, one practical embodiment whereof is herein shown and described.

Having fully described my invention, what I claim as new, and desire to secure by Letters Patent, is—

1. In a selvage-motion for looms, in combination, two selvage-harnesses at each side of the loom, a connection between and to cause opposite reciprocation of the harnesses of each pair, a common actuator, and separate transmitting means between it and the two connections.

2. In a loom, a shed-forming mechanism for each selvage, including two positively-connected and oppositely-movable harness members for the selvage-warps, combined with a common actuating device, and separate transmitting means between it and the two shed-forming mechanisms to operate the same.

3. In a loom, a shed-forming mechanism for each selvage, including two positively-connected and oppositely-movable harness members for the selvage-warps, and means to cause a differential movement of the connected harness members, combined with a common actuator for said mechanisms, and separate transmitting means between the latter and the actuator.

4. In a selvage-motion for looms, in combination, two selvage-harnesses at each side of the loom, a positive overhead connection between and to cause opposite reciprocation of the harnesses of each pair, an actuator, and independent, positively-acting transmitting means between it and each of the two overhead connections.

5. In a selvage-motion for looms, in combination, two selvage-harnesses at each side of the loom, a positive overhead connection between and from which the harnesses of each pair are suspended, each connection including means to cause opposite reciprocation of the adjacent harnesses and impart a greater stroke to the back harness, an actuator, and separate transmitting means between it and each connection.

6. In a loom, a shed-forming mechanism for each selvage, including two oppositely-movable harness members for the selvage-warps, combined with actuating means including a single cam and separate, positively-acting transmitting devices intermediate it and the two shed-forming mechanisms, to operate the same.

7. In a loom, separate shed-forming mechanism for each selvage, means to cause the planes of the selvage-sheds to substantially coincide with the planes of the main sheds, and a common actuating-cam operatively and independently connected with each of said selvage mechanisms.

8. In a loom, separate shed-forming mechanism for each selvage, a common actuator, and a separate transmitting connection between it and each of said selvage mechanisms.

9. In a selvage-motion for looms, in combination, two selvage-harnesses at each side of the loom, a positive, differential connection between each pair of harness, to effect their movement in opposite directions with strokes of different length, a common actuator, and transmitting means between it and the two connections, to operate the same.

10. In a loom, separate shed-forming mechanism for each selvage, including oppositely-movable harness members for the selvage-warps, and means to cause a differential reciprocating movement of the said harness members to thereby bring the planes of the selvage-sheds into substantial alinement with the planes of the main shed, combined with an actuating-cam common to both mechanisms, and separate transmitting connections between the latter and said cam.

11. In a loom, separate shed-forming mechanism for each selvage, including oppositely-movable harness members for the selvage-warps, combined with an actuating-cam having a crossed cam-path, and connections between the said mechanisms and the cam, each connection including a follower coöperating with the cam-path.

12. In a loom, separate shed-forming mechanism for each selvage, including oppositely-movable harness members for the selvage-warps, combined with an actuating-cam having a crossed cam-path, and positive connections between said mechanisms and the cam, each connection including a vibrator having a follower coöperating with the cam-path.

13. In a loom, separate shed-forming mechanism for each selvage, including oppositely-movable harness members for the selvage-warps, combined with an actuating-cam having a crossed cam-path, and connections between the said mechanisms and the cam, each connection including a switch-follower coöperating with the cam-path.

14. In a loom, separate shed-forming mechanism for each selvage, combined with an actuating-cam, two vibrators coöperating therewith, and a link operatively connecting each vibrator with one of said mechanisms.

15. In a selvage-motion for looms, in combination, two oppositely-movable harness members at each side of the loom, for the selvage-warps, a pair of positively-connected and oppositely-moving rockers for and from which each pair of harness members is suspended, an actuator, and separate operating connections between it and one of the rockers of each pair, to therethrough effect reciprocation of the harness members suspended therefrom.

16. In a selvage-motion for looms, in combination, two oppositely-movable harness members at each side of the loom, for the selvage-warps, an overhead rocker for and from which each harness member is suspended, gearing connecting the adjacent rockers, to effect their angular movement oppositely and thereby reciprocate the connected harness members, an actuating member, and connections between it and each pair of rockers, said connections including links pivotally attached to one rocker of each pair.

17. In a selvage-motion for looms, a pair of rockers at each side of the loom, gearing to effect opposite and differential movement of the rockers of each pair, a harness member for the selvage-warp positively connected with each rocker, an actuating-cam having a crossed cam-path, two vibrators provided with followers coöperating with the cam-path, and a link connecting each vibrator with one of the rockers of a pair, to effect opposite reciprocation of the adjacent pairs of harness members with a differential stroke.

18. The combination, with two selvage-harnesses at each side of the loom, and an overhead connection between each pair, comprising two rocking members geared together to move oppositely and from which the harnesses are suspended, a pattern-surface, and separate transmitting means between it and the overhead connections, to operate the harnesses therethrough.

19. The combination, with two selvage-harnesses at each side of the loom, and an overhead connection between each pair, comprising two rocking members, from which the harnesses are suspended and differentially geared together to move oppositely and impart a differential reciprocation to their harnesses, a pattern-surface, and separate transmitting means between it and the overhead connections, to operate the harnesses therethrough.

20. In a loom, a crank-shaft, separate shed-forming mechanism for each selvage, an actuator common to both mechanisms and operatively connected therewith, and meshing gears fast with relation to the crank-shaft and actuator, respectively, to rotate the latter.

21. In a loom, a crank-shaft, separate shed-forming mechanism for each selvage, an actuating-cam for and operatively and separately connected with both of said mechanisms, and a direct driving connection between the crank-shaft and cam.

22. In a loom, separate shed-forming mechanism for each selvage, an actuating-cam having a continuous, crossed cam-path, two vibrators each connected with one of said mechanisms, a switch-follower on each vibrator to coöperate with the cam-path, and means to rotate the cam, each follower traversing the entire cam-path for every two revolutions of the cam.

23. In a loom, separate shed-forming mechanism for each selvage, an actuating-cam having a continuous, crossed cam-path, two vibrators each connected with one of said mechanisms, a follower on each vibrator to coöperate with the cam-path, and means to cause each follower to cross from one to the other portion of the cam-path to traverse the entire length thereof.

24. In a loom, separate shed-forming mechanism for each selvage, a common actuator for said mechanisms, consisting of a peripherally skew-toothed disk having a cam-groove on its face composed of inner and outer communicating lobes, a continuously-rotating driving-gear having spirally-arranged skew-teeth to mesh with and rotate said disk, and connections between the latter and the selvage mechanisms, each connection including a vibrator and a switch-follower to traverse the cam-groove and pass automatically from one to the other lobe thereof.

25. In a loom, separate shed-forming mechanism for each selvage, a common actuator, and operative connections between said mechanisms and actuator, whereby the separate selvage mechanisms shall be operated at different times.

In testimony whereof I have signed my name to this specification in the presence of two subscribing witnesses.

CHARLES F. ROPER.

Witnesses:
GEORGE OTIS DRAPER,
ERNEST W. WOOD.